(12) United States Patent
Cloots (10) Patent No.: US 10,369,815 B2
(45) Date of Patent: Aug. 6, 2019

(54) INKJET PRINTING DEVICE WITH REMOVABLE FLAT SUBSTRATE SUPPORT DEVICE

(71) Applicant: AGFA NV, Mortsel (BE)

(72) Inventor: Tom Cloots, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/769,760

(22) PCT Filed: Oct. 20, 2016

(86) PCT No.: PCT/EP2016/075243
§ 371 (c)(1),
(2) Date: Apr. 20, 2018

(87) PCT Pub. No.: WO2017/068050
PCT Pub. Date: Apr. 27, 2017

(65) Prior Publication Data
US 2018/0229516 A1    Aug. 16, 2018

(30) Foreign Application Priority Data

Oct. 23, 2015   (EP) ..................................... 15191191

(51) Int. Cl.
*B41J 11/00* (2006.01)
*B41J 11/06* (2006.01)
(Continued)

(52) U.S. Cl.
CPC ............. *B41J 11/0085* (2013.01); *B41J 3/28* (2013.01); *B41J 3/407* (2013.01); *B41J 3/4078* (2013.01);
(Continued)

(58) Field of Classification Search
CPC ..... B41J 11/0085; B41J 11/002; B41J 11/005; B41J 11/007; B41J 11/06; B41J 13/02; B41J 3/28; B41J 3/407; B41J 3/4078
See application file for complete search history.

(56) References Cited

U.S. PATENT DOCUMENTS

| 2004/0017456 | A1 | 1/2004 | Obertegger et al. |
| 2009/0151583 | A1* | 6/2009 | Dangelewicz ........ B41F 35/007 101/425 |

(Continued)

FOREIGN PATENT DOCUMENTS

| EP | 1 004 440 A2 | 5/2000 |
| EP | 2 407 311 A1 | 1/2012 |

(Continued)

OTHER PUBLICATIONS

Official Communication issued in International Patent Application No. PCT/EP2016/075243, dated Dec. 16, 2016.

*Primary Examiner* — Kristal Feggins
*Assistant Examiner* — Kendirck X Liu
(74) *Attorney, Agent, or Firm* — Keating and Bennett, LLP (57) ABSTRACT

An inkjet printing device includes a vacuum flatbed table configured to support large and flat substrates with applied vacuum power and while printing, in a hold down area, against the vacuum flatbed table; a removable flat substrate support device configured to support large and flat substrates while printing; and a vacuum belt connected to a plurality of pulleys and wrapped around the vacuum flatbed table; wherein the vacuum flatbed table is configured for coupling the removable flat substrate support device stationary to the vacuum flatbed table by applied vacuum power; and the vacuum belt is sandwiched between the removable flat substrate support device and the vacuum flatbed table.

9 Claims, 5 Drawing Sheets

(51) Int. Cl.
*B41J 13/02* (2006.01)
*B41J 3/28* (2006.01)
*B41J 3/407* (2006.01)

(52) U.S. Cl.
CPC ............ *B41J 11/002* (2013.01); *B41J 11/005* (2013.01); *B41J 11/007* (2013.01); *B41J 11/06* (2013.01); *B41J 13/02* (2013.01)

(56) References Cited

U.S. PATENT DOCUMENTS

2010/0209169 A1* 8/2010 Mandel ................. B41J 11/005
 400/619
2011/0150552 A1 6/2011 McLaughlin et al.

FOREIGN PATENT DOCUMENTS

| EP | 2 899 029 A1 | 7/2015 |
| WO | 02/22362 A2 | 3/2002 |
| WO | 2013/066293 A1 | 5/2013 |
| WO | 2015/015481 A1 | 2/2015 |

* cited by examiner

INKJET PRINTING DEVICE WITH REMOVABLE FLAT SUBSTRATE SUPPORT DEVICE

CROSS REFERENCE TO RELATED APPLICATIONS

This application is a 371 National Stage Application of PCT/EP2016/075243, filed Oct. 20, 2016. This application claims the benefit of European Application No. 15191191.4, filed Oct. 23, 2015, which is incorporated by reference herein in its entirety.

BACKGROUND OF THE INVENTION

1. Field of the Invention

The present invention relates to a large inkjet printing device, especially a vacuum flatbed table inkjet printing device, for supporting large substrates on different manners.

2. Description of the Related Art

The availability of better performing print heads, such as less drop-outs and failing nozzles, and the lower cost of print heads, the maximum printing size of inkjet printing system is enlarged to print on large or multiple substrates such as wood, glass or printing plates. To support these large or multiple substrates, a large vacuum flatbed table has to be manufactured. A maximum use of the large vacuum flatbed table results in a higher amount of print jobs and better productivity which is economically beneficial.

Several inkjet printing device manufacturers sells moving gantry vacuum flatbed table inkjet printers wherein a large substrate is loaded on a vacuum flatbed table and a gantry, comprising a set of print heads, is moved above the loaded substrate. The set of print heads scans back-and-forth above the substrate while printing. Examples of such moving gantry vacuum flatbed table inkjet printers are FUJIFILM™ Acuity Advance Select X2, Agfa Graphics™:Jeti Mira and SwissQPrint™ Nyala 2. These inkjet printing devices are especially suitable for the sign & display markets.

Another method used in vacuum flatbed table inkjet printing devices is moving the vacuum flatbed table with the loaded large substrate underneath a set of print-heads, comprised on a gantry. The set of print heads scans back-and-forth while printing such as Agfa Graphics™:Jeti 3020 Titan. These inkjet printing devices are especially suitable for the sign & display markets.

The several existing methods of vacuum flatbed table inkjet printing devices have all their own advantages such as accuracy, high volume production, versatility.

The state-of-the-art vacuum flatbed table inkjet printing devices comprise one large vacuum flatbed table to support and to print a certain set of substrates but if another substrate needs special handling, such as transporting, another vacuum flatbed table inkjet printing device has to be used. The use of multiple flatbed inkjet printing devices makes it economically inefficient to fill daily all these inkjet printer devices with print-jobs and in an industrial environment 7-days-on-7 days. Each inkjet printing device in production need also separate calibration time and refurbishing time, whether or not, together with specific inkjet printing device knowledge.

That is why there is a need for inkjet printing devices which are capable of using all kind of substrates to print-on so productivity becomes higher on the inkjet printing devices with less loss of service and calibration of the inkjet printing devices.

SUMMARY OF THE INVENTION

In order to overcome the problems described above, preferred embodiments of the present invention have been realised with an inkjet printing device and an inkjet printing method as defined below.

In particular the present invention is the use of a removable stationary flat substrate (502) support device for supporting flat substrates (502) to print on which can be coupled to the vacuum flatbed table (400) of the inkjet printing device to make it easy to switch between the vacuum flatbed table (400) for supporting and printing common substrates, such as paper, to the removable stationary flat substrate support device for supporting and printing other substrates, such as glass. This gives the present invention the advantage to handle; support and print on all kind of substrates without switching from inkjet printing device but only supplying a removable stationary flat substrate (502) support device on the vacuum flatbed table (400) from the inkjet printing device. The present invention makes the inkjet printing device a "multi-substrate inkjet printing device".

Further advantages and embodiments of the present invention will become apparent from the following description.

BRIEF DESCRIPTION OF THE DRAWINGS

FIG. 4, FIG. 5, FIG. 6, FIG. 7, and FIG. 8 illustrate preferred embodiments of the present invention wherein a removable flat substrate support device (100) is supported on the vacuum flatbed table (400) from the state-of-the-art inkjet printing device (300) according FIG. 3.

FIG. 10 and FIG. 11 illustrate preferred embodiments of the present invention wherein a removable flat substrate support device (100) is supported on the vacuum belt (432) (432) and thus the vacuum flatbed table (400) from the state-of-the-art inkjet printing device (300) according FIG. 9. The power to rotate the vacuum belt (432) (432) is switched of, which is illustrated as a cross-symbol in the pulleys (431) instead of an arrow-symbol in the pulleys (431).

DETAILED DESCRIPTION OF THE PREFERRED EMBODIMENTS

The present invention is an inkjet printing device (300) comprising a vacuum flatbed table (400) configured to support flat substrates (502) with applied vacuum power and while printing, in a hold down area between 3 $m^2$ and 50 $m^2$, against the vacuum flatbed table (400); and a removable flat substrate support device (100) configure to support flat substrates (502) while printing, in a contact area between 3 $m^2$ and 50 $m^2$; and a quick release fastener for coupling the removable flat substrate support device (100) stationary to the vacuum flatbed table (400) and/or wherein the vacuum flatbed table (400) is configured for coupling the removable flat substrate support device (100) stationary to the vacuum flatbed table (400) by applied vacuum power. An inkjet printing device (300) comprising a vacuum flatbed table (400) is also called a vacuum flatbed table inkjet printing device.

The hold down area is more preferably between 4 $m^2$ and 40 $m^2$ and most preferably between 5 and 25 $m^2$. Larger the size of flat substrates (502) that is capable to print on, greater the productivity of the inkjet printing device (300).

The contact area is more preferably between 4 $m^2$ and 40 $m^2$ and most preferably between 5 and 25 $m^2$. Larger the size of flat substrates (502) that is capable to print on, greater the productivity of the inkjet printing device (300). The contact area defines the maximum surface area of a substrate that can be supported by the removable flat substrate support device (100).

In a preferred embodiment the hold down area has the same form as the contact area and in more preferably has the same rectangular form as the contact area; most preferably the size of the hold down area is between 100% and 125% larger than the contact area. The present invention is an advantage for large sized and flat substrates (502) so the vacuum flatbed table (400) and the removable flat substrate support device (100) are both capable of supporting large and flat substrates (502). A large substrate is a substrate with a minimum print side 1.5 $m^2$.

The present invention is also an inkjet printing method on an inkjet printing device (300) which comprises a vacuum flatbed table (400) configured to support flat substrates (502) with applied vacuum power and while printing, in a hold down area between 3 $m^2$ and 50 $m^2$, against the vacuum flatbed table (400); and wherein the inkjet printing method comprises following steps:

a1) supporting a first flat substrate (502) on the vacuum flatbed table (400); and a2) printing an ink layer on the first flat substrate (502) by a print head (305); and a3) unloading the printed first flat substrate (502) from the vacuum flatbed table (400); and b) coupling a removable flat substrate support device (100), which is configured to support flat substrates (502) while printing, in a contact area between 3 $m^2$ and 50 $m^2$; to the vacuum flatbed table (400) by a quick release fastener; and/or by applying vacuum power from the vacuum flatbed table (400);

c1) supporting a second flat substrate (502) on the removable flat substrate support device (100); and c2) printing a second ink layer on the second flat substrate (502) by the print head (305);

c3) unloading the printed second flat substrate (502) from the removable flat substrate support device (100).

In a more preferred embodiment the inkjet printing method comprises additional steps:

d1) decoupling the removable flat substrate support device (100); and d2) removing the removable flat substrate support device (100) away from the vacuum flatbed table (400); and d3) coupling another removable flat substrate support device (100), which is configured to support flat substrates (502) while printing, in a contact area between 3 m$^2$ and 50 m$^2$; to the vacuum flatbed table (400) by a quick release fastener; and/or by applying vacuum power from the vacuum flatbed table (400); and e1) supporting a third flat substrate (502) on the other removable flat substrate support device (100); and e2) printing a third ink layer on the third flat substrate (502) by the print head (305); and e3) unloading the printed third flat substrate (502) from the removable flat substrate support device (100).

The present invention has the advantage to handle and supporting flat substrate (502) differently by switching between the vacuum flatbed table (400) and the removable flat substrate support device (100) or to another removable flat substrate support device (100), depending on the characteristics of a flat substrate (502) such a weight, fragility or scratch resistance. The scratch resistance is especially important when the back-side is already printed, as in recto-verso printing.

So the present invention is capable of using several types of substrates to make productivity higher on the inkjet printing device (300) such as folding carton, acrylic plates, honeycomb board, corrugated board, foam, medium density fibreboard, solid board, rigid paper board, fluted core board, plastics, aluminium composite material, foam board, corrugated plastic, carpet, textile, thin aluminium, paper, rubber, adhesives, vinyl, veneer, varnish blankets, wood, flexographic plates, metal based plates, fibreglass, plastic foils, transparency foils, adhesive PVC sheets, impregnated paper and others.

Figure 1:
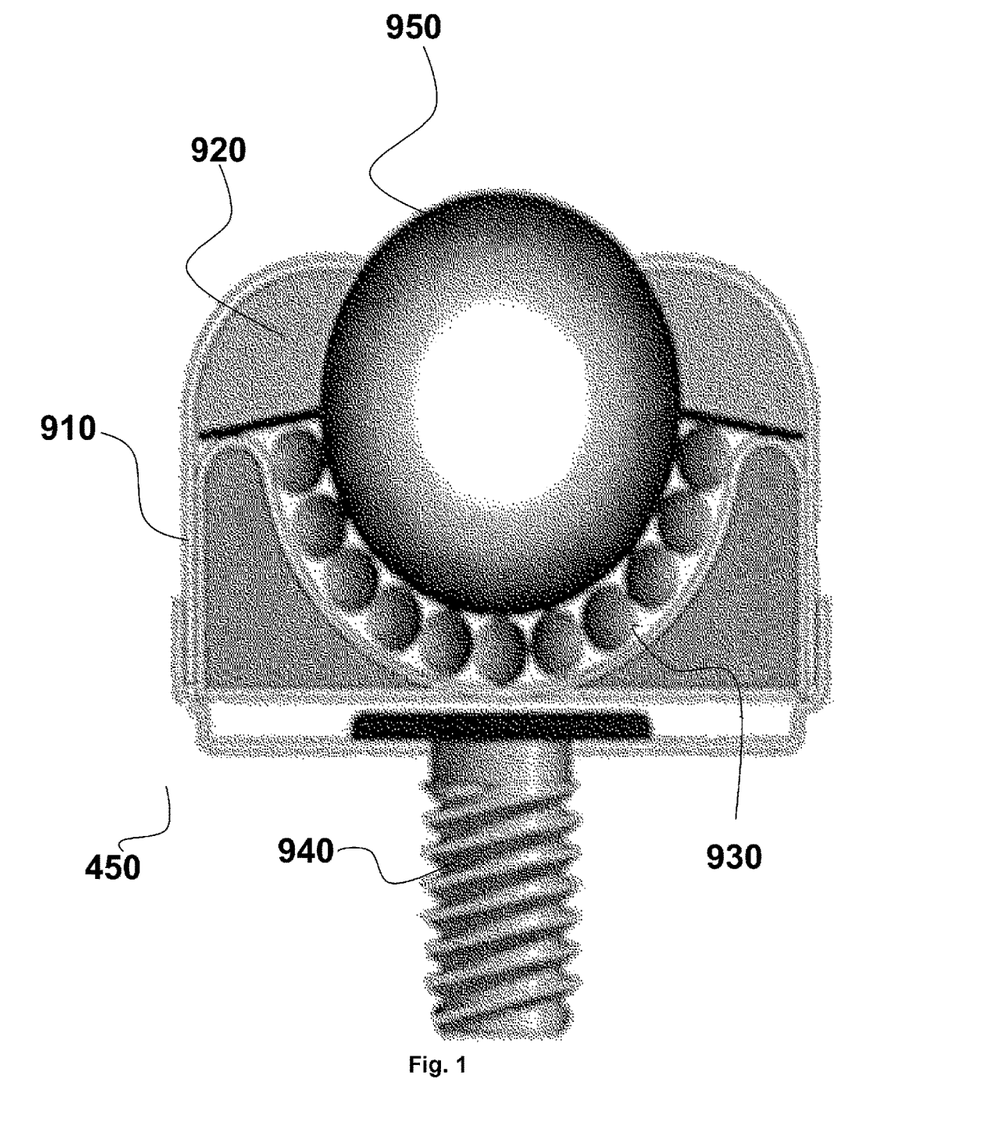
FIG. 1 illustrates a cross-cut of a ball transfer unit (450) (450) comprising a load ball (950) (950) attached to a plurality of smaller support balls (930) (930) for rotating the load ball (950) (950) smoothly. The illustrated ball transfer unit (450) (450) comprises a felt seal (920) to prevent that the housing (910) (910) inside, such as the support balls (930) (930), become dirty. The ball transfer unit (450) (450) may be constructed on a ball transfer table (150) by a bout (940). The ball transfer table (150) is not visible in the figure.
Figure 2:
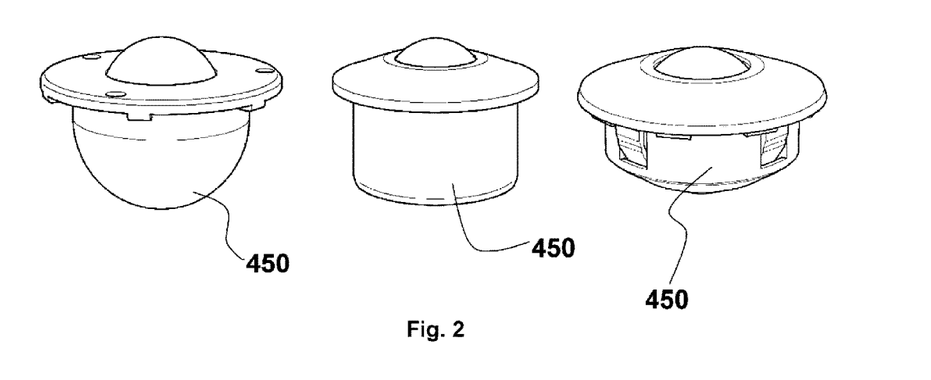
FIG. 2 illustrates several types of ball transfer units (450) (450).
Figure 3:
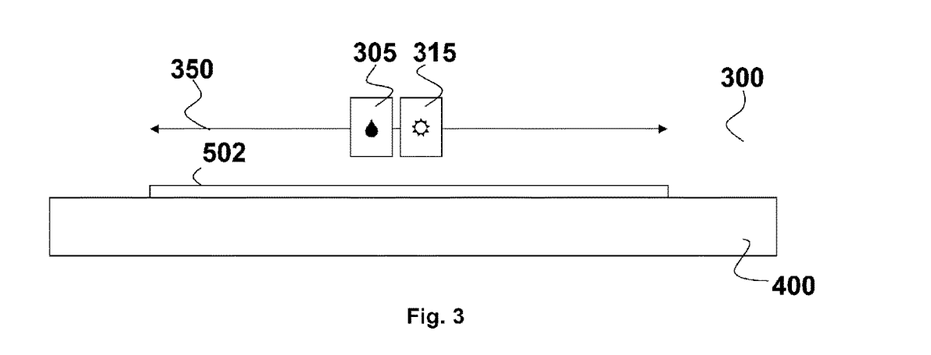
FIG. 3 illustrates a cross-cut of an inkjet printing device (300) from the state-of-the-art, a typical vacuum flatbed table inkjet printing device, such as Agfa Graphics™:Jeti Mira. The inkjet printing device (300) comprises a print head (305) and a drying system (315) for jetting an ink on the flat substrate (502). The flat substrate (502) is supported on a large vacuum flatbed table (400) by connecting to the support surface of the vacuum flatbed table (400). The printing of a liquid is performed by moving the print head (305) and drying system (315) back-and-forth above the vacuum flatbed table (400).
Figure 4:
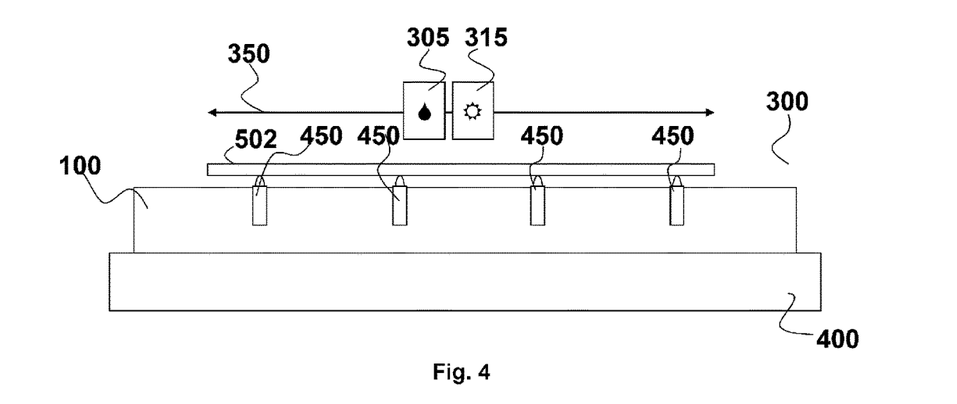
FIG. 4 illustrates a preferred embodiment wherein the removable flat substrate support device (100) comprises a set of ball transfer units (450) (450) to support a flat substrate (502) for printing on it, instead of the vacuum flatbed table (400). The removable flat substrate support device (100) is coupled to the vacuum flatbed table (400) by its vacuum power.

In a preferred embodiment the removable flat substrate support device (100), based on the characteristics of flat substrates (502) comprises a set of idler rollers configured to support gently a flat substrate (502); and/or a set of ball transfer units (450) configured to position a heavy weight flat substrate (502) with a density between 750 kg/m$^3$ and 20000 kg/m$^3$ (see FIG. 4). The density of a heavy-weight substrate is more preferably between 1250 kg/m$^3$ and 10000 kg/m$^3$, and most preferably between 2000 kg/m$^3$ and 5000 kg/m$^3$.

Especially heavy-weight flat substrate in the state-of-the-art vacuum flatbed table inkjet printing device are not suitable to easily transport this kind of flat substrates and not suitable to easily position this kind of flat substrates on the vacuum flatbed table (400). Especially when an operator has to manually move such heavy-weight substrates for loading and positioning. Currently most countries are following ergonomics standards and relevant methods for risk assessment and management in WMSDs (Work-related Musculoskeletal Disorders) area such as: what is the largest weight that can be tilted and/or manipulated by an operator? A very high standard for this kind of risks is defined in the European Standard EN 1005-2 "Safety of machinery—Human physical performance—Part 2: Manual handling of machinery and component parts of machinery", April 2003. This European Standard specifies ergonomic recommendations for the design of machinery involving manual handling of machinery and component parts of machinery, including tools linked to the machine. The comprising of the set of ball transfer units (450) in this preferred embodiment is a serious benefit to solve this issue on WMSDs by operators of vacuum flatbed table inkjet printers and to satisfy these norms on ergonomics standards.

For gently supporting a flat substrate (502), for example because the flat substrate (502) is brittle, an idler roller or a plurality of idler rollers (108) is comprised in the removable flat substrate (502) supporting substrate may have a roller hardness at 25° C. lower than 70 Shore A according to the ASTM D2240 standard. The idler roller may comprise rubber; a thermosetting polymer and/or polyurethane (see FIG. 8, FIG. 10, and FIG. 11). An idler roller may be soft foam rollers or paper feed rollers. A removable flat substrate support device (100) comprising such set of idler rollers may have also a web guiding system for supporting flat substrates (502) from roll-to-roll and guiding these flat substrates (502), which are a web, straight through the inkjet printing device (300). A web guiding system uses a sensor to monitor the web position for lateral tracking the flat substrate (502) from roll-to-roll, and each has an actuator to shift the running web mechanically back on course whenever the sensor detects movement away from the set path. Actuators may be pneumatic or hydraulic cylinders. In a preferred embodiment the sensor is a non-contact sensor and may be pneumatic; photoelectric; ultrasonic or infrared. The web guiding system put the output signals from the sensor in to a form that can drive the actuator.

The removable flat substrate support device (100) may also comprise a vacuum chamber on it is own for providing at its support surface vacuum power to hold down the supported flat substrates (502). The vacuum chamber is not the same vacuum chamber which is connected to the vacuum flatbed table (400). To hold down the removable flat substrate support device (100) on the vacuum flatbed table the vacuum power for such large vacuum flatbed table (400) and large removable flat substrate support device (100) is not possible to use it also on the support surface from the removable flat substrate support device (100).

For supplying power on the removable flat substrate support device (100) the vacuum flatbed table (400) preferably comprises power supplying connection means, more preferably incorporated in the support surface of the vacuum flatbed table (400), most preferably flat in the same plane of the support surface of the vacuum flatbed table (400). The power on the removable flat substrate support device (100) may be needed for the treatment means (120).

The present invention is also advantageous that the vacuum flatbed table (400) is less damaged: for example specific flat substrates (502) in the present invention are supported by the removable flat substrate support device (100) so flat substrate (502), such as glass, may not causing scratching in the vacuum flatbed table (400). It is important to know that damages on the vacuum flatbed table (400) such as scratches and dents may cause print quality issues on supported substrates on the vacuum flatbed table (400) due to the height differences in these damages and the jetting velocity of the print head (305) in the inkjet printing device (300).

Another advantage is that removable flat substrate support device (100) may comprise means that makes the supporting of flat substrates (502) easier without damaging the flat substrates (502) while supporting which should occur when the flat substrate (502) is supported on the vacuum flatbed table (400).

Also the removable flat substrate support device (100) may comprise means that apply a treatment on the backsside of supported flat substrates (502) which results in a better print quality on the print-side of the supported flat substrates (502). This treatment depends on the kind of a substrate, such as glass and/or print application such as inkjet leader printing. The treatment may be a pre-treatment method which means a treatment of the supported flat substrate (502) before printing and/or may be a post-treatment method which means a treatment of the supported flat substrate (502) after printing and/or may be a treatment method while printing.

Figure 6:
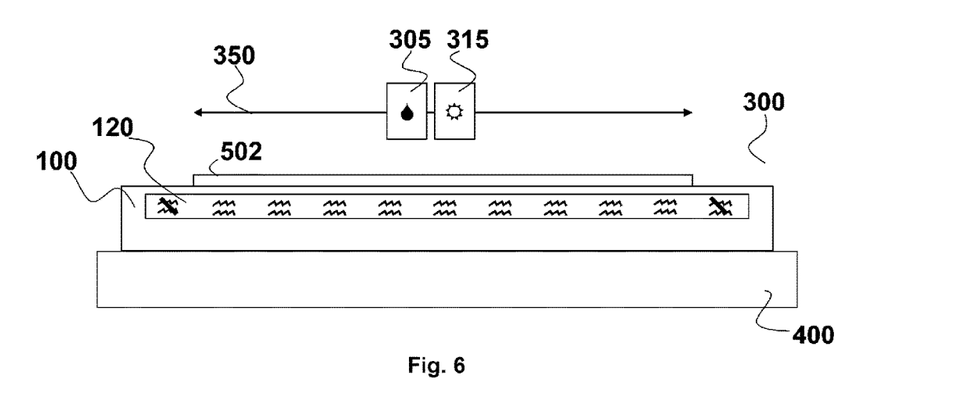
FIG. 6 illustrates a preferred embodiment wherein the removable flat substrate support device (100) comprises treatment means (120) to regulate a controlled humidity to the flat substrate (502). The treatment means (120), here a humidity controller, comprises several moisture feeders where some of them are switched off at the non-supporting regions. A moisture feeder, switched on, is illustrated as double wave symbol. A moisture feeder, switched off, is illustrated as strikethrough double wave symbol. The removable flat substrate support device (100) is coupled to the vacuum flatbed table (400) by its vacuum power.
Figure 7:
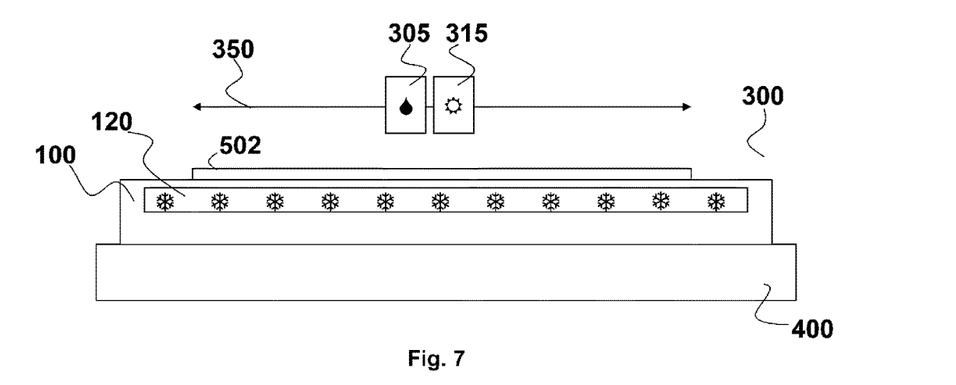
FIG. 7 illustrates a preferred embodiment wherein the removable flat substrate support device (100) comprises a treatment means (120) to apply a controlled temperature to the flat substrate (502). The treatment means (120), here a temperature controller, comprises several cooling elements where some of them are switched off at the non-supporting regions. A cooling element, switched on, is illustrated as snow flake symbol. The removable flat substrate support device (100) is coupled to the vacuum flatbed table (400) by its vacuum power.

Preferred treatment means, which may be pre-, post- and/or while printing treatment means are
- a temperature regulator (see FIG. 7) configured to heat and/or to cool a supported flat substrate (502) from its back-side; and/or
- a curing device (see FIG. 5) configured to immobilize a jetted ink layer on a supported flat substrate (502) from its back-side; and/or
- a humidity regulator (see FIG. 6) configured to humidify and/or dehumidify by a liquid a supported flat substrate (502) from its back-side; and/or
- thermal insulation material to reduce temperature transfer from the supported flat substrate (502) through its back-side to the vacuum flatbed table (400) or from the vacuum flatbed table (400) to the supported flat substrate (502).

These preferred treatment means are performed while a flat substrate (502) is supported on the removable flat substrate support device (100). The thermal insulation may comprise fiberglass (specifically glass wool), cellulose, rock wool, polystyrene foam, urethane foam, vermiculite, perlite and/or cork.

A preferred treatment means is a substrate treatment means wherein the flat substrate (502) is treated.

The curing device is preferably configured to pin-curing or final-curing a jetted UV ink layer by comprising an UV-source. The UV-source may be an UV bulb-lamp or plurality of UV LED's. A curing device may also comprise an IR-dryer, NIR-dryer and/or SWIR-dryer. The curing device may any curing device as in an inkjet printing device (300) for immobilizing the ink layers on supported flat substrates (502). The temperature regulator may comprise a cooler and/or a heater such as an electric heater. It preferable comprises a temperature sensor. A humidity regulator comprises preferably a humidity sensor. The thermal insulation material is preferably needed when a cold flat substrate below 15° C. is supported or a hot flat substrate above 40° C. is supported.

The temperature regulator may heats the back-side to a predetermined temperature or a temperature within a predetermined temperature range. Preferably the lowest temperature of the predetermined temperature range is higher than 60° C., more preferably higher than 80° C. an most preferably higher than 100° C. Preferably the highest temperature of the predetermined temperature range is higher than 120° C., more preferably higher than 180° C. an most preferably higher than 200° C.

In a preferred embodiment the treatment means may selectively treat the back-side of the flat substrate (502). So the treatment means may create a plurality of treatment zones for treating the back-side of a supported substrate in the created treatment zones.

Figure 5:
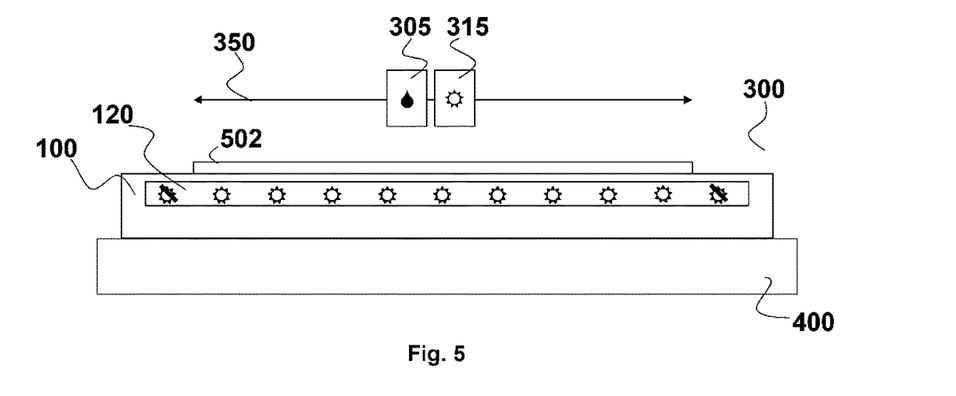
FIG. 5 illustrates a preferred embodiment wherein the removable flat substrate support device (100) comprises treatment means (120) to immobilize through the back-side of the flat substrate (502) jetted liquid from the print head (305) on the print-side of the flat substrate (502). The jetted liquid forming a liquid layer or ink layer is not visible in this illustration. The treatment means (120), here a curing device, comprises several dry sources where some of them are switched off at the non-supporting regions. A drying source, switched on, is illustrated as a sun symbol. A drying source, switched off, is illustrated as strikethrough sun symbol. The removable flat substrate support device (100) is coupled to the vacuum flatbed table (400) by its vacuum power.

In a preferred embodiment the treatment means may change the size from a treatment zone on the removable flatbed substrate support device (see FIG. 5, FIG. 6) for example when no flatbed substrate is supported in the non-treatment zones. For the curing device, as treatment means in this preferred embodiment, the curing device comprises a plurality of UV LED sources and/or units of UV LED sources which can be set on/off independently from each other (FIG. 5). Similar the humidity regulator may comprise a plurality of moisture feeders which can be set on/off independently from each other (FIG. 6) or the temperature regulator may comprise a plurality of heaters and/or coolers which can be set on/off independently from each other. The sizable treatment zones are advantageous if the treatment causes malfunctioning of a print head (305) or other means, comprised in the inkjet printing device (300).

Other treatment means may be
- a cleaning unit to clean the back-side of the supported flat substrate (502); and/or
- a digital printing unit to print on the back-side of the supported flat substrate (502); and/or
- a label attaching unit to attach a label on the back-side of the supported flat substrate (502); and/or
- a RFID tag attaching unit to attach a RFID tag on the back-side of the supported flat substrate (502); and/or
- a degreasing unit to degrease the back-side of the supported flat substrate (502); and/or
- a coating device to coat the back-side of the supported flat substrate (502) with a liquid; and/or
- anti-static device for removing static charges on the supported flat substrate (502); and/or
- impregnation device to impregnate the back-side of the supported flat substrate (502) with a liquid, preferably a liquid comprising a thermosetting resin.

All these other treatment means are advantageous in the production of printed flat substrates (502).

Figure 8:
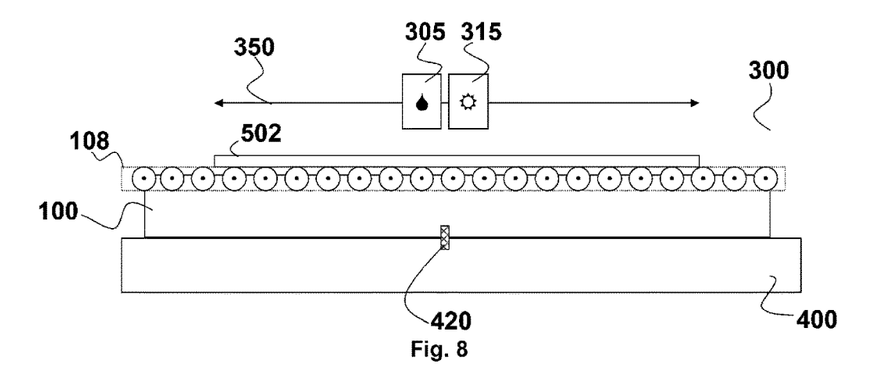
FIG. 8 illustrates a preferred embodiment wherein the removable flat substrate support device (100) comprises a set of idler rollers (108) for gentle supporting the flat substrate (502). The removable flat substrate support device (100) is coupled by a quick release fastener (420) to the vacuum flatbed table (400).
Figure 9:
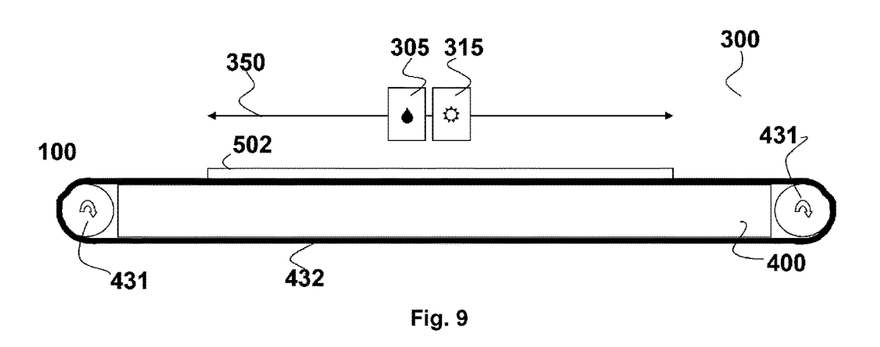
FIG. 9 illustrates a cross-cut of an inkjet printing device (300) from the state-of-the art, a typical vacuum flatbed table inkjet printing device with vacuum belt (432), such as Agfa Graphics™:Jeti Tauro. The inkjet printing device (300) comprises a print head (305) and a drying system (315) for jetting an ink on the flat substrate (502). The flat substrate (502) is supported on a large vacuum belt (432) (432) and a vacuum flatbed table (400), connected to the support surface of the vacuum belt (432) (432) by vacuum power of the large vacuum flatbed table (400). The printing of a liquid is performed by moving the print head (305) and drying system (315) back-and-forth above the vacuum flatbed table (400). The vacuum flatbed table (400) is wrapped with a vacuum belt (432) (432) rotating on two pulleys (431). The rotation is illustrated as an arrow-symbol in the pulleys (431).

In the present invention the coupling by the vacuum flatbed table (400) or a quick release fastener, which may also be a plurality of quick release fasteners, makes the present invention advantageous by make it possible to fast switch between a flat substrate support on the vacuum flatbed table and a flat substrate support on a removable flat substrate support device (100) (FIG. 8). A quick release fastener may be a quarter turn fastener, tension latch, Livelock™ panel fastener; quick release pin. A known manufacturer of such fasteners is Protex Fasteners Ltd (www.protex.com). In the present invention preferred embodiments wherein the vacuum flatbed table (400) is configured for coupling the removable flat substrate support device (100) stationary to the vacuum flatbed table (400) by applied vacuum power, is more preferred instead of only coupled by a quick release fastener. Because the positioning and fixing of the removable flat substrate support device (100) to the vacuum flatbed table (400) is more precise. In a preferred embodiment the quick release fastener is positioned outside the printing zone of the inkjet printing device (300) so it may not touch or crash against a print head (305) in the inkjet printing device (300) when printing.

In a preferred embodiment the removable flat substrate support device (100) comprises a sticky layer for supporting a flat substrate (502) by glue. The glue is preferably a pressure-sensitive adhesive for easy loading and unloading a flat substrate (502) on and from the removable flat substrate support device (100). This preferred embodiment prevents to add glue on the vacuum flatbed table (400), as sticky layer, which is hard to remove when no sticky layer is needed anymore on the flatbed vacuum.

The inkjet printing device (300) may comprise a security system for holding supported flat substrates (502) fixed on and aligned to the removable flat substrate support device (100). To prevent that the supported substrates moves upwards from the removable flat substrate support device (100), such security system is advantageous else the upwards moved supported substrate may crash against and damage a print head (305) of the inkjet printing device (300). Also the aligning of the flat supported substrate in this preferred embodiment makes it for the inkjet printing device (300) easier to know the position of the supported substrate to print on.

The security system may be comprised in the removable flat substrate support device itself and preferably it comprises a vacuum chamber on it is own for providing at its support surface vacuum power to hold down the supported flat substrates (502).

Figure 10:
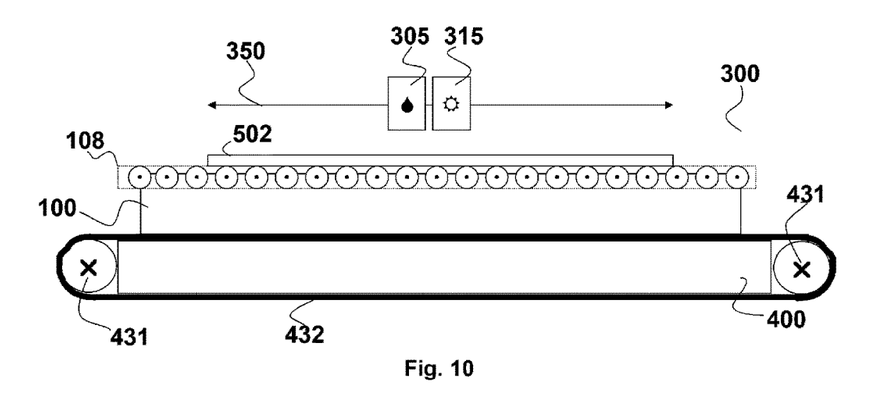
FIG. 10 illustrates a preferred embodiment wherein the removable flat substrate support device (100) comprises a set of idler rollers (108) for gentle supporting the flat substrate (502). The removable flat substrate support device (100) is coupled to the vacuum flatbed table (400) by its vacuum power and wherein the vacuum belt (432) (432) is sandwiched between removable flat substrate support device (100) and vacuum flatbed table (400).
Figure 11:
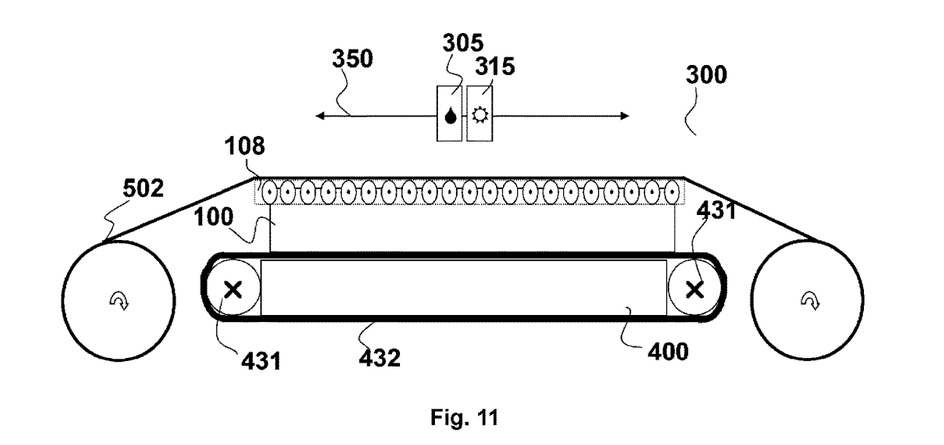
FIG. 11 illustrates a preferred embodiment, similar as in FIG. 10 but wherein the flat substrate (502) is transported roll to roll by rotating the output roll so the flat substrate (502) is dragged over the removable flat substrate support device (100).

In a preferred embodiment the inkjet printing device (300) comprises a vacuum belt (432), which is connected to a plurality of pulleys (431) and wrapped around the vacuum flatbed table (400); and wherein the vacuum belt (432) is stationary and sandwiched between the removable flat substrate support device (100) and the vacuum flatbed table (400) (see FIG. 10 and FIG. 11). This preferred embodiment is a serious technical progress wherein an inkjet printing device (300) with vacuum belt (432) can easily be switches to an inkjet printing device (300) with another type of flat substrate (502) support. The removable flat substrate support device (100) is stationary but while switching the removable flat substrate support device (100) may be carried on the vacuum belt (432) and moved until it is above the vacuum flatbed table (400) before coupling. When the removable flat substrate support device (100) is coupled the vacuum belt (432) is preferably secured not to move anymore. The removable flat substrate support device (100) in this preferred embodiment makes it possible to handle and to support flat substrates (502) differently when for example a flat substrate (502) is too brittle for transporting on a vacuum belt (432).

It is found that this preferred embodiment is also advantageous for supporting flexible flat substrates (502) such as textile from roll-to-roll when the removable flat substrate support device (100) has a flat support surface and preferably it comprises idler rollers for gentle supporting the flexible substrates (see FIG. 11). In this preferred embodiment the flexible substrate is transported by dragging the flexible substrate on the removable flat substrate support device (100) for example by a rotor which rotates the output roll of the flexible substrate and thus not by the vacuum belt (432). The removable flat substrate support device (100) is configured to prevent snagging and/or wrinkling of the flexible flat substrate (502) such as textile. In a vacuum flatbed table inkjet printing device wherein the vacuum flatbed table (400) is wrapped by a vacuum belt (432), the tension of the vacuum belt (432) on the pulleys (431) deform slightly the pulleys (431) so the speed of transporting a flexible substrate over the pulleys (431) is in the middle different than at the edges of the pulleys (431). This speed difference cause wrinkles in the flexible substrate, such as textile from roll-to-roll. By adding a removable flat substrate support device (100) on the vacuum belt (432), supported on the vacuum belt (432) and thus the vacuum flatbed table (400); this speed difference on the pulleys (431), connected to the vacuum belt (432), is no obstacle anymore for wrinkle-free transport of flexible substrates. The flexible substrate is dragged over the added removable flat substrate support device (100).

The removable flat substrate support device (100) is preferably a plug-and-play device so the inkjet printing device (300) is auto-configured when the removable flat substrate support device (100) is coupled to the vacuum flatbed table (400). Plug-and-play is defined as denoting or relating to devices that are intended to work perfectly when first used or connected, without reconfiguration or adjustment by the operator or service engineer.

Switch to Glass Sheet Inkjet Printing Device:

In a preferred embodiment the inkjet printing device (300) is switchable from a vacuum flatbed table inkjet printing device, more preferably a sign & display inkjet printing device, to a glass sheet inkjet printing device by the removable flat substrate support device (100) suitable for glass sheet support and wherein the removable flat substrate support device (100) may comprise a set of ball transfer units (450) to support gentle the glass sheets and to transport easily the heavy weight glass sheets on the inkjet printing device (300). A sign & display inkjet printing device is an inkjet printing device (300) suitable for the sign & display market.

Switch to Leather Inkjet Printing Device

In a preferred embodiment the inkjet printing device (300) is switchable from a vacuum flatbed table inkjet printing device, more preferably a sign & display inkjet printing device, to a leather inkjet printing device by the removable flat substrate support device (100) suitable for leather support and wherein the removable flat substrate support device (100) may comprise a temperature regulator to regulate the temperature, especially heating, of the leather while supported on the inkjet printing device (300) and printed by the inkjet printing device (300). Heating the leather improves the penetration of the ink into the leather and artificial leather. Artificial leather is a fabric intended to substitute leather in fields such as upholstery, clothing, and fabrics, and other uses where a leather-like finish is required but the actual material is cost-prohibitive, unsuitable, or unusable for ethical reasons.

Artificial leather is marketed under many names, including "leatherette", "faux leather", and "pleather". Suitable artificial leather includes poromeric imitation leather, corfam, koskin and leatherette. Suitable commercial brands include Biothane™ from BioThane Coated Webbing, Birkibuc™ and Birko-Flor™ from Birkenstock, Kydex™ from Kleerdex, Lorica™ from Lorica Sud, and Fabrikoid™ from DuPont. Applications of these leathers include upholstery, clothing, shoes and the like. In a preferred embodiment the present invention is comprised in the manufacturing of one of these applications.

In a preferred embodiment in this switched inkjet printing device to a leather inkjet printing device, the leather or artificial leather is transported roll to roll wherein the output roll is dragging the leather or artificial leather is by rotating the output roll by a rotator. The removable flat substrate support device (100) preferably comprises a web guiding system.

Switch to Flexible Substrate Inkjet Printing Device

In a preferred embodiment the inkjet printing device (300) is switchable from a vacuum flatbed table inkjet printing device, more preferably a sign & display inkjet printing device, to a flexible inkjet printing device by the removable flat substrate support device (100) suitable for flexible substrate support and wherein the removable flat substrate support device (100) may comprise a temperature regulator to regulate the temperature, especially cooling, of the flexible substrate while supported on the inkjet printing device (300) and printed by the inkjet printing device (300). Cooling the flexible substrate prevents the changes in dimensions of the flexible substrates while curing and/or printing.

In a preferred embodiment in this switched inkjet printing device to a flexible substrate inkjet printing device, the flexible substrate is transported roll to roll wherein the output roll is dragging the flexible substrate is by rotating the output roll by a rotator. The removable flat substrate support device (100) preferably comprises a web guiding system.

The flexible substrate is preferably a thermoplastic foil, more preferably a thermoplastic foil selected from the groups consisting of polyvinyl chloride (PVC), polyolefins like polyethylene (PE) and polypropylene (PP), polyamides (PA), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or co-polymers of these. An application of these thermoplastic foils includes polymeric decorative panels. In a preferred embodiment the present invention is comprised in the manufacturing of this application: a method for manufacturing polymeric decorative panels according to a preferred embodiment of the present invention includes the steps of: inkjet printing an image on a thermoplastic foil using an aqueous pigmented inkjet ink; applying a second thermoplastic foil on the inkjet printed image; heat pressing the first and second thermoplastic foils into a decorative laminate; and cutting the laminate into a decorative panel.

Vacuum Chamber

A vacuum chamber is a rigid enclosure which is constructed by many materials preferably it may comprise a metal. The choice of the material is based on the strength, pressure and the permeability. The material of the vacuum chamber may comprise stainless steel, aluminium, mild steel, brass, high density ceramic, glass or acrylic.

A vacuum pump provides a vacuum pressure inside a vacuum chamber and is connected by a vacuum pump connector, such as a tube, to a vacuum pump input such as aperture in the vacuum chamber. Between the vacuum pump connector a vacuum controller, such as a valve or a tap, may be provided to control the vacuum in a sub-vacuum chamber wherein the aperture is positioned.

To prevent contamination, such as paper dust, substrate fibers, ink, ink residues and/or ink debris such as cured ink, to contaminate via the set of air-channels of the vacuum table and/or the set of vacuum-belt-air-channels (505) from the vacuum belt (432) the interior means of the vacuum pump, a filter, such as an air filter and/or coalescence filter, may be connected to the vacuum pump connector. Preferably a coalescence filter, as filter, is connected to the vacuum pump connector to split liquid and air from the contamination in the vacuum pump connector.

Vacuum Flatbed Table (400)

To avoid registration problems while printing on a substrate and to avoid collisions while conveying a substrate, the substrate needs to be connected to a printing table. A vacuum flatbed table (400) is a printing table wherein the substrate is connected to the printing table by vacuum pressure. A vacuum flatbed table (400) is also called a porous printing table. Between the substrate and the vacuum flatbed table (400) may be a vacuum belt (432) when a vacuum belt (432) is wrapped around the vacuum flatbed table (400).

Preferably the vacuum flatbed table (400) in the embodiment comprises a set of air-channels to provide a pressure differential by a vacuum chamber at the support layer of the vacuum flatbed table (400) to create a vacuum zone and at the bottom-surface of the printing table a set of apertures which are connected to the set of air-channels. These apertures at the bottom layer may be circular, elliptical, square, rectangular shaped and/or grooves, such as slits, parallel with the bottom layer of the vacuum flatbed table (400).

The width or height of the vacuum flatbed table (400) is preferably from 1.0 m until 10 m. The larger the width and/or height, the larger the substrate may be supported by the vacuum flatbed table (400) which is an economical benefit.

An aperture at the bottom-surface and at the support surface of the vacuum flatbed table (400) may be connected to one or more air-channels. An aperture at the bottom-surface or support surface of the vacuum flatbed table (400) may be small in size, preferably from 0.3 to 12 mm in diameter, more preferably from 0.4 to 8 mm in diameter, most preferably from 0.5 to 5 mm in diameter and preferably spaced evenly apart on the vacuum belt (432) preferably 1 mm to 50 mm apart, more preferably from 4 to 30 mm apart and most preferably from 5 to 15 mm apart to enable the creation of uniform vacuum pressure that connects a substrate together with the vacuum flatbed table (400).

A set of apertures at the support layer of the vacuum flatbed table (400) may be connected to the air-channels. These apertures at the support layer may be circular, elliptical, square, rectangular shaped and/or grooves, such as slits, parallel with the support layer of the vacuum flatbed table (400). Preferably, if the apertures are grooves, the grooves are oriented along the printing direction of the inkjet printing device (300).

Preferably the vacuum flatbed table (400) of the embodiment comprising a honeycomb structure plate which is sandwiched between a top and bottom sandwich plate which comprises each a set of apertures connect to one or more air-channels in the vacuum flatbed table (400). The honeycomb cores, as part of the air-channels, in the honeycomb structure plate results in a better uniform vacuum distribution on the support surface of the vacuum flatbed table (400).

The dimensions and the amount of air-channels should be sized and frequently positioned to provide sufficient vacuum pressure to the vacuum flatbed table (400). Also the dimensions and the amount of apertures at the bottom-surface of the vacuum flatbed table (400) should be sized and frequently positioned to provide sufficient vacuum pressure to the vacuum flatbed table (400). The dimension between two air-channels or two apertures at the bottom-surface of the vacuum flatbed table (400) may be different. A honeycomb core is preferably sinusoidal or hexagonal shaped.

If a honeycomb structure plate is comprised in the vacuum flatbed table (400) also the dimensions and the amount of honeycomb cores should be sized and frequently positioned to provide sufficient vacuum pressure to the vacuum flatbed table (400). The dimensions between two neighbour honeycomb cores may be different.

The support layer of the printing table should be constructed to prevent damaging of a substrate or vacuum belt (432) if applicable. For example the apertures at the support layer that are connected with the air-channels may have rounded edges. The support layer of the printing table may be configured to have low frictional specifications.

The vacuum flatbed table (400) is preferably parallel to the ground whereon the inkjet printing system is connected to avoid misaligned printed patterns.

The vacuum pressure in a vacuum zone on the support surface of the vacuum flatbed table (400) may couple the substrate and the vacuum flatbed table (400) by sandwiching the vacuum belt (432) that carries the substrate. The coupling is preferably done while printing to hold down the substrate to avoid bad alignment and color-on-color register problems. The vacuum pressure in a vacuum zone on the support surface of the vacuum flatbed table (400) may apply sufficient normal force to the vacuum belt (432) when the vacuum belt (432) is moving and carrying a substrate in the conveying direction. The vacuum pressure may also prevent any fluttering and/or vibrating of the vacuum belt (432) or substrate on the vacuum belt (432). The vacuum pressure in a vacuum zone may be adapted while printing.

The top-surface of the vacuum flatbed table (400) or a portion of the vacuum flatbed table (400), such as the inner side of its air-channels may be coated to have easy cleaning performances e.g. as result of dust or ink leaks. The coating is preferably a dust repellent and/or ink repellent and/or hydrophobic coating. Preferably the top-surface of the vacuum flatbed table (400) or a portion of the vacuum flatbed table (400), such as the inner side of its air-channels, is treated with an ink repelling hydrophobic method by creating a lubricious and repelling surface which reduces friction.

Vacuum-Belt-Air-Channel

A vacuum-belt-air-channel is an air-channel from the top-surface to the bottom-surface of the vacuum belt (432). It is also called a suction-hole if the perimeter of the vacuum-belt-air-channel at the top-surface is substantially circular.

The area of a vacuum-belt-air-channel at the top-surface of the vacuum belt (432) is in the present invention preferably between 0.3 mm2 and 5 mm2. More preferably the perimeter of the vacuum-belt-air-channel at the top-surface has the same shape as a circle, ellipse, oval, rectangle, triangle, square, rectangle, pentagon, hexagon, heptagon, octagon or any polygon containing at least three sides.

The vacuum-belt-air-channel is preferably tapered in the direction of the bottom-surface for optimal vacuum pressure effect at the top-surface.

The perimeter of a suction-hole is preferably from 0.3 to 10 mm in diameter, more preferably from 0.4 to 5 mm in diameter, most preferably from 0.5 to 2 mm in diameter The vacuum-belt-air-channels in the air-sucking zone are preferably spaced evenly apart on the vacuum belt (432) preferably 3 mm to 50 mm apart, more preferably from 4 to 30 mm apart and most preferably from 5 to 15 mm apart to enable the creation of uniform vacuum pressure that holds the substrate together with the vacuum belt (432). Smaller the apertures in the vacuum belt (432), higher the vacuum pressure at the top of the vacuum belt (432).

It was found that in a vacuum belt (432) which comprises a carcass in glass fabric and holes smaller than 3 mm gives a superb vacuum to hold down the substrate versus the state-of-the-art. The advantage of glass fabric web versus other fabric web, as carcass in a vacuum belt (432), makes it easier to drill small holes smaller than 3 mm in diameter without remaining fibers at the edges of the holes after drilling. If fibers remain at the edges of the holes, the vacuum pressure is influenced badly to hold down the substrates.

Vacuum-belt-air-channel is preferably drilled, perforated or cut in the vacuum belt (432) but also a laser may form a vacuum-belt-air-channel in a vacuum belt (432).

Vacuum Belt (432)

Preferably the vacuum belt (432) has two or more layers of materials wherein an under layer provides linear strength and shape, also called the carcass and an upper layer called the cover or the support side. The carcass is preferably a woven fabric web and more preferably a woven fabric web of polyester, nylon, glass fabric or cotton. The material of the cover is preferably various rubber and more preferably plastic compounds and most preferably thermoplastic polymer resins. But also other exotic materials for the cover can be used such as silicone or gum rubber when traction is essential. An example of a multi-layered conveyor belt for a general belt conveyor system wherein the cover having a gel coating is disclosed in US 20090098385 A1 (FORBO SIEBLING GMBH).

Preferably the vacuum belt (432) comprises glass fabric or the carcass is glass fabric and more preferably the glass fabric, as carcass, has a coated layer on top comprising a thermoplastic polymer resin and most preferably the glass fabric has a coated layer on top comprising polyethylene terephthalate (PET), polyamide (PA), high-density polyethylene (HDPE), polytetrafluoroethylene (PTFE), polyoxymethylene (POM), polyurethaan (PU) and/or Polyaryletherketone (PAEK). The coated layer may also comprise aliphatic polyamides, polyamide 11 (PA 11), polyamide 12 (PA 12), UHM-HDPE, HM-HDPE, Polypropylene (PP), Polyvinyl chloride (PVC), Polysulfone (PS), Poly(p-phenylene oxide) (PPOTM), Polybutylene terephthalate (PBT), Polycarbonate (PC), Polyphenylene sulphide (PPS).

Preferably the vacuum belt (432) is and endless vacuum belt (432). Examples and figures for manufacturing an endless multi-layered vacuum belt (432) for a general belt conveyor system are disclosed in EP 1669635 B (FORBO SIEBLING GMBH).

The top-surface of the vacuum belt (432) or a portion of the vacuum belt (432), such as its air-channels, may be coated to have easy cleaning as result of e.g. dust or ink leaks. The coating is preferably a dust repellent and/or ink repellent and/or hydrophobic coating. Preferably the top-surface of the vacuum belt (432) or a portion of the vacuum, belt is treated with an ink repelling hydrophobic method by creating a lubricious and repelling surface which reduces friction.

A layer of neutral fibres in the vacuum belt (432) is preferably constructed at a distance from the bottom surface between 2 mm and 0.1 mm, more preferably between 1 mm and 0.3 mm. This layer with neutral fibres is of big importance to have a straight conveying direction with minimal side force on the vacuum belt (432) and/or minimized fluctuation of the Pitch Line of the vacuum belt (432) for high printing precision transportation.

The top surface of the vacuum belt (432) comprises preferable hard urethane with a preferred thickness (measured from top surface to bottom surface) between 0.2 to 2.5 mm. The total thickness (measured from top surface to bottom surface) of the vacuum belt (432) is preferably between 1.2 to 7 mm. The top-surface is preferably high resistance to solvents so the inkjet printing device (300) is useful in an industrial printing and/or manufacturing environment.

Ball Transfer Unit (450)

A ball transfer unit (450) is an omni-directional load-bearing spherical balls mounted inside a fixture, also called a housing (910). A ball transfer unit (450) does not comprise any motor for moving the load ball (950), so the ball transfer unit (450) is an idle means. Also the ball transfer units (450) are not restricted to one or two directional rotation. The fixture is mostly a restraining fixture. The design of a ball transfer unit (450) is typically a single large ball, also called load ball (950), supported by smaller ball bearings, also called support balls (930). They are mainly used in airports for heavy-weight luggage delivery wherein the load ball (950) supports the luggage. A plurality of ball transfer units (450) are arranged to create a support plane for luggages. Such arrangement is also called a ball transfer table wherein the luggage is pushed manually, through gravity, over the plurality of free rotating balls in the ball transfer units (450), fixed to a large frame or table. It is known that they are very effective where the luggage size is big and need to be pushed manually over long or short distance. In a preferred embodiment the removable flat substrate support device (100) is a ball transfer table.

R.G.P INTERNATIONAL (www.rpgballs.com) and SKF USA (www.linearmotion.skf.com) are manufacturers of ball transfer units (450). They provide a whole range of designs for supporting heavy-weight materials on ball transfer units (450). They also provide solutions on the arrangement of ball transfer units (450) on a frame or table such as squared pitch or diamond pitch or extended pitch depending on the size of the heavy-weight materials that the ball transfer units (450) have to support.

More detailed information about the technical working of ball transfer units (450) are disclosed in U.S. Pat. No. 3,466,697 (BEARING SEALS & GEARS), U.S. Pat. No. 7,007,787 (ROLLER BEARING COMPANY OF AMERICA), EP1316518 (GOODRICH CORPORATION) and U.S. Pat. No. 3,739,894 (WESTERN GEAR CORP).

It is found that a ball transfer unit (450) for the present invention preferably is:
  a ball transfer unit (450) with washing fluid supplier with an ink cleaning liquid for suitable cleaning of ink debris from the load ball (950) and the support balls (930); and/or
  a ball transfer unit (450) with safeguard fluid supplier with an ink safeguard liquid for suitable safeguarding the rotation capacities of the ball transfer unit (450) which are contaminated with ink debris; and/or
  ball transfer unit (450) with lubrication ports to incorporate, refilling, adding or replacing lubrications to the support balls (930) because incident drying radiation from the inkjet printing device (300) may dry the lubricator of the support balls (930); and/or
  a ball transfer unit (450) with a set of drain hole to drain ink debris from the ball transfer unit (450); and/or
  a ball transfer unit (450) with a seal ring, comprising a brush to prevent the contamination of the internal housing (910) and support balls (930) and/or to prevent drying radiation in the internal housing (910) and on the support balls (930). The drying radiation may cause non-ductile rotation of the load ball (950) and/or support balls (930) due to semi-dried or full-dried lubricator around the support balls (930). A seal ring in the state-of-the-art for ball transfer units (450) is a felt seal (920) and not a brush. An embodiment of the present invention is a ball transfer unit (450) and not only in the field of inkjet printing devices (300) but also generally for all kind of transporting devices comprising a seal for preventing dust coming in the ball transfer unit (450) and wherein the seal is a brush. More preferred embodiments of this seal, attached to a ball transfer unit (450), comprising a brush are disclosed in the chapter "Other embodiment 1".

The load ball (950) of a ball transfer unit (450) is preferably, more preferably also the fixture, is radiation resistant from a drying source to immobilize jetted layers on the supported flat substrate (502) in the inkjet printing device (300). The radiation resistant is in a preferred embodiment UV radiation resistant when the inkjet printing device (300) comprises an UV-source to immobilize jetted layers on the supported flat substrate (502).

The friction coefficient of the ball transfer unit (450), expressed as percent of the mass from the flat substrate (502), is preferably between 10% and 0.001% and more preferably between 5% and 0.01% and most preferably between 1% and 0.1%.

For high temperature resistance components of the ball transfer unit (450) are preferably made of steel and more preferably made of stainless steel and most preferably made of AISI 420C stainless steel.

For long life service of the ball transfer unit (450), the ball transfer unit (450) may be coated with corrosion treatment.

In a preferred embodiment the ball transfer units (450) has a conveying speed between 0.1 m/sec and 5 m/sec, more preferably between 1 m/sec and 3 m/sec for positioning and transporting the flat substrate (502) when supported by the ball transfer units (450). A high conveying speed is an advantage for fast transporting and/or positioning the flat substrate (502) on the inkjet printing device (300). The conveying speed is the maximum speed to transport and/or position manually a flat substrate (502), when supported by the ball transfer units (450) in the inkjet printing device (300).

The load ball (950) in a ball transfer unit (450) has preferably a diameter between 3 mm and 100 mm, more preferably between 8 mm and 70 mm and most preferably between 10 mm and 50 mm. The height of a ball transfer unit (450) has to be chosen so the distance to may move away the ball transfer units (450) from the support surface (SSF) is minimal but in the mind that the diameter of the load ball (950) has to be optimal determined to support flat substrates (502) based on weight of flat substrates (502) and the friction between the load ball (950) and flat substrates (502).

The load ball (950) in a ball transfer unit (450) may comprise engineering thermoplastic such as Polyoxymethylene (POM), Phenolic Resin; AISI 420 stainless steel or AISI 440 stainless steel. The engineering thermoplastic prevents scratches on the back-side of the flat substrates (502), especially when the back-side is already printed, as in recto-verso printing.

Ball transfer units (450) on a ball transfer table (15 are typically arranged in regular and/or symmetrical way so they form a lattice pattern, which may have ball transfer unit (450) rows and ball transfer unit (450) columns. In a preferred embodiment this lattice pattern to arrange the ball transfer units (450) is rhombic lattice, hexagonal lattice, parallelogram lattice, equilateral triangular lattice or a honeycomb lattice.

More preferably the ball transfer units (450) are arranged in a randomly arranged pattern or pseudo-randomly arranged pattern and in a most preferred embodiment the ball transfer units (450) are arranged in a blue noise pseudo-randomly arranged pattern. It is found that with this more preferred embodiment and most preferred embodiment that flat substrates (502) are faster transported an surely faster positioned in the inkjet printing device (300).

A ball transfer unit (450) should be constructed to prevent damaging of a flat substrate (502). For example the edges of the housing (910) from the ball transfer unit (450) may have rounded edges. The ball transfer unit (450) and the edges of the housing (910) may be configured to have low frictional specifications.

The load ball (950) preferable comprises engineering plastics for scratch-free transporting and/or positioning of the flat substrate (502) when supported on the ball transfer units (450). The engineering plastics comprises preferably for scratch-free handling highly durable polyimide, such as DuPont™ Vespel, or Polybenzimidazole, such as Duratron™ CU60 PBI, or Polyether ether ketone, also called PEEK.

Inkjet Printing Device (300)

An inkjet printing device (300), such as an inkjet printer, is a marking device that is using a print head (305) or a print head (305) assembly with one or more print heads (305), which jets a liquid, as droplets or vaporized liquid, on a substrate to form an ink layer. A pattern that is marked by jetting of the inkjet printing device (300) on a substrate is preferably an image. The pattern may be achromatic or chromatic colour.

A preferred embodiment of the inkjet printing device (300) is that the inkjet printing device (300) is an inkjet printer and more preferably a wide-format inkjet printer. Wide-format inkjet printers are generally accepted to be any inkjet printer with a print width over 17 inches. Inkjet printers with a print width over the 100 inches are generally called super-wide printers or grand format printers. Wide-format printers are mostly used to print banners, posters, textiles and general signage and in some cases may be more economical than short-run methods such as screen printing.

A flatbed table in the inkjet printing device (300) may move under a print head (305) or a gantry may move a print head (305) over the flatbed table. These so called flatbed table inkjet printers most often are used for the printing of planar substrates, ridged substrates and sheets of flexible substrates. They may incorporate, a drying system (315), such as IR-dryers or UV-dryers, to prevent prints from sticking to each other as they are produced. An example of a wide-format printer and more specific a flatbed table inkjet printer is disclosed in EP1881903 B (AGFA GRAPHICS NV). A flatbed table may be a vacuum flatbed table (400). The flatbed table inkjet printers are than called vacuum flatbed table inkjet printers.

Preferably the inkjet printing device (300) comprises one or more print heads (305) jetting UV curable ink to mark substrate and a UV source (=Ultra Violet source), as dryer source, to cure the inks after marking. Spreading of a UV curable inkjet ink on a substrate may be controlled by a partial curing or "pin curing" treatment wherein the ink droplet is "pinned", i.e. immobilized where after no further spreading occurs. For example, WO 2004/002746 (INCA) discloses an inkjet printing method of printing an area of a substrate in a plurality of passes using curable ink, the method comprising depositing a first pass of ink on the area; partially curing ink deposited in the first pass; depositing a second pass of ink on the area; and fully curing the ink on the area.

A preferred configuration of UV source is a mercury vapour lamp. Within a quartz glass tube containing e.g. charged mercury, energy is added, and the mercury is vaporized and ionized. As a result of the vaporization and ionization, the high-energy free-for-all of mercury atoms, ions, and free electrons results in excited states of many of the mercury atoms and ions. As they settle back down to their ground state, radiation is emitted. By controlling the pressure that exists in the lamp, the wavelength of the radiation that is emitted can be somewhat accurately controlled, the goal being of course to ensure that much of the radiation that is emitted falls in the ultraviolet portion of the spectrum, and at wavelengths that will be effective for UV curable ink curing. Another preferred UV source is an UV-Light Emitting Diode, also called an UV-LED.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing. UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device (300) contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device (300) often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

The inkjet printing device (300) may comprise an IR source (=Infra Red source) to solidify the ink by infra-red radiation. The IR source is preferably a NIR source (=Near Infra Red source) such as a NIR lamp or a SWIR (=Short Wave Infra Red source) such as a SWIR lamp. The IR source may comprise carbon infrared emitters which has a very short response time.

The IR source or UV source in the above preferred embodiments create a drying zone on the flatbed table to immobilize jetted ink on the substrate. Analogue as the drying zone, the inkjet printing device (300) comprises also a printing zone on the flatbed table which defines the maximum print size of the inkjet printing device (300).

The inkjet printing device (300) may comprise corona discharge equipment to treating the substrate before the substrate passes a print head (305) of the inkjet printing device (300) because some substrates have chemically inert and/or nonporous top-surfaces leading to a low surface energy which may result in bad print quality.

The terms "partial dry", "pin dry", and "full dry" refer to the degree of drying, i.e, the percentage of converted functional groups, and may be determined by for example RT-FTIR (Real-Time Fourier Transform Infra-Red Spectroscopy) a method well known to the one skilled in the art of drying formulations. A partial dry, also called a pin dry, is defined as a degree of curing wherein at least 5%, preferably at least 10%, of the functional groups in the coated formulation is converted. A full dry is defined as a degree of drying wherein the increase in the percentage of converted functional groups, with increased exposure to radiation (time and/or dose), is negligible. A full dry corresponds with a conversion percentage that is within 10%, preferably within 5%, from the maximum conversion percentage defined by the horizontal asymptote in the RT-FTIR graph (percentage conversion versus curing energy or drying time).

The inkjet printing device (300) may contain a thermal curing device for removing water and organic solvents in the inkjet printed image. The thermal curing device may consist out of different units.

A pre-heating device may be included in the inkjet printing device (300) for heating the substrate prior to jetting. The pre-heating device may be an infrared radiation source as described here below, or may be a heat conduction device, such as a hot plate or a heat drum. A preferred heat drum is an induction heat drum.

The thermal curing device may include a dryer. Suitable dryers include devices circulating hot air, ovens, and devices using air suction. However for reducing energy consumption, preferably infrared radiation sources are used for thermal curing.

Preferred infrared radiation sources include near infrared radiation sources (NIR: 750-1400 nm) and short wave infrared radiation sources (SWIR: 1400-3000 nm). An advantage is that glass lenses, which may be included in the curing device for focusing the infrared light on the substrate, transmit in this infrared region, contrary to mid-wavelength infrared light (MWIR: 3000-8000 nm) or long-wavelength infrared light (LWIR: 8000-15000 nm).

The most preferred infrared light source is a SWIR light source because the water absorption significantly increases at 1450 nm.

A commercial example of a SWIR light source is a carbon infrared emitter CIR™ available from HERAEUS, for example emitting at a wavelength of about 2000 nm.

Another preferred thermal curing device is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

Commercially available NIR emitters are available from ADPHOS™.

The thermal curing device may be, preferably at least in part, arranged in combination with the print head (305) of the inkjet printer, travelling therewith so that the curing radiation is applied very shortly after jetting. This allows pinning the aqueous UV free radical curable inkjet ink when jetted on the substrate.

Corona Discharge Equipment

Corona discharge equipment consists of a high-frequency power generator, a high-voltage transformer, a stationary electrode, and a treater ground roll. Standard utility electrical power is converted into higher frequency power which is then supplied to the treater station. The treater station applies this power through ceramic or metal electrodes over an air gap onto the material's surface.

A corona treatment can be applied in the present invention to unprimed substrates (200), but also to primed substrates (200).

Print Head (305)

A print head (305) is a means for jetting a liquid on a substrate through a nozzle. The nozzle may be comprised in a nozzle plate which is attached to the print head (305). A print head (305) preferably has a plurality of nozzles which may be comprised in a nozzle plate. A set of liquid channels, comprised in the print head (305), corresponds to a nozzle of the print head (305) which means that the liquid in the set of liquid channels can leave the corresponding nozzle in the jetting method. The liquid is preferably an ink, more preferably an UV curable inkjet ink or water based inkjet ink, such as a water based resin inkjet ink. The liquid used to jet by a print head (305) is also called a jettable liquid.

The way to incorporate print heads (305) into an inkjet printing device (300) is well-known to the skilled person.

A print head (305) may be any type of print head (305) such as a Valvejet print head, Piezoelectric print head, thermal print head (305), a continuous print head (305) type, electrostatic drop on demand print head (305) type or acoustic drop on demand print head (305) type or a page-wide print head (305) array, also called a page-wide inkjet array.

A print head (305) comprises a set of master inlets to provide the print head (305) with a liquid from a set of external liquid feeding units. Preferably the print head (305) comprises a set of master outlets to perform a recirculation of the liquid through the print head (305). The recirculation may be done before the droplet forming means but it is more preferred that the recirculation is done in the print head (305) itself, so called through-flow print heads (305). The continuous flow of the liquid in a through-flow print heads (305) removes air bubbles and agglomerated particles from the liquid channels of the print head (305), thereby avoiding blocked nozzles that prevent jetting of the liquid. The continuous flow prevents sedimentation and ensures a consistent jetting temperature and jetting viscosity. It also facilitates auto-recovery of blocked nozzles which minimizes liquid and receiver wastage.

The number of master inlets in the set of master inlets is preferably from 1 to 12 master inlets, more preferably from 1 to 6 master inlets and most preferably from 1 to 4 master inlets. The set of liquid channels that corresponds to the nozzle are replenished via one or more master inlets of the set of master inlets.

The amount of master outlets in the set of master outlets in a through-flow print head (305) is preferably from 1 to 12 master outlets, more preferably from 1 to 6 master outlets and most preferably from 1 to 4 master outlets.

In a preferred embodiment prior to the replenishing of a set of liquid channels, a set of liquids is mixed to a jettable liquid that replenishes the set of liquid channels. The mixing to a jettable liquid is preferably performed by a mixing means, also called a mixer, preferably comprised in the print head (305) wherein the mixing means is attached to the set of master inlets and the set of liquid channels. The mixing means may comprise a stirring device in a liquid container, such as a manifold in the print head (305), wherein the set of liquids are mixed by a mixer. The mixing to a jettable liquid also means the dilution of liquids to a jettable liquid. The late mixing of a set of liquids for jettable liquid has the benefit that sedimentation can be avoided for jettable liquids of limited dispersion stability.

The liquid leaves the liquid channels by a droplet forming means, through the nozzle that corresponds to the liquid channels. The droplet forming means are comprised in the print head (305). The droplet forming means are activating the liquid channels to move the liquid out the print head (305) through the nozzle that corresponds to the liquid channels.

The amount of liquid channels in the set of liquid channels that corresponds to a nozzle is preferably from 1 to 12, more preferably from 1 to 6 and most preferably from 1 to 4 liquid channels.

The print head (305) of the present invention is preferably suitable for jetting a liquid having a jetting viscosity of 8 mPa·s to 3000 mPa·s. A preferred print head (305) is suitable for jetting a liquid having a jetting viscosity of 20 mPa·s to 200 mPa·s; and more preferably suitable for jetting a liquid having a jetting viscosity of 50 mPa·s to 150 mPa·s.

Valvejet Print Head

A preferred print head (305) for the present invention is a so-called Valvejet print head. Preferred valvejet print head have a nozzle diameter between 45 and 600 µm. The valvejet print head comprising a plurality of micro valves, allow for a resolution of 15 to 150 dpi that is preferred for having high productivity while not comprising image quality. A valvejet print head is also called coil package of micro valves or a dispensing module of micro valves. The way to incorporate valvejet print head into an inkjet printing device (300) is well-known to the skilled person. For example, US 2012105522 (MATTHEWS RESOURCES INC) discloses a valvejet printer including a solenoid coil and a plunger rod having a magnetically susceptible shank. Suitable commercial Valvejet print head are chromoJET™ 200, 400 and 800 from Zimmer, Printos™ P16 from VideoJet and the coil packages of micro valve SMLD 300's from Fritz Gyger™. A nozzle plate of a Valvejet print head is often called a faceplate and is preferably made from stainless steel.

The droplet forming means of a valvejet print head controls each micro valve in the valvejet print head by actuating electromagnetically to close or to open the micro valve so that the medium flows through the liquid channel. Valvejet print head preferably have a maximum dispensing frequency up to 3000 Hz.

In a preferred embodiment the valvejet print head the minimum drop size of one single droplet, also called minimal dispensing volume, is from 1 nL (=nanoliter) to 500 µL (=microliter), in a more preferred embodiment the minimum drop size is from 10 nL to 50 µL, in a most preferred embodiment the minimum drop size is from 10 nL to 300 µL. By using multiple single droplets, higher drop sizes may be achieved.

In a preferred embodiment the valvejet print head has a native print resolution from 10 DPI to 300 DPI, in a more preferred embodiment the valvejet print head has a native print resolution from 20 DPI to 200 DPI and in a most preferred embodiment the valvejet print head has a native print resolution from 50 DPI to 200 DPI.

In a preferred embodiment with the valvejet print head the jetting viscosity is from 8 mPa·s to 3000 mPa·s more preferably from 25 mPa·s to 1000 mPa·s and most preferably from 30 mPa·s to 500 mPa·s.

In a preferred embodiment with the valvejet print head the jetting temperature is from 10° C. to 100° C. more preferably from 20° C. to 60° C. and most preferably from 25° C. to 50° C.

Piezoelectric Print Head

Another preferred print head (305) for the present invention is a piezoelectric print head. Piezoelectric print head, also called piezoelectric inkjet print head (305), is based on the movement of a piezoelectric ceramic transducer, comprised in the print head (305), when a voltage is applied thereto. The application of a voltage changes the shape of the piezoelectric ceramic transducer to create a void in a liquid channel, which is then filled with liquid. When the voltage is again removed, the ceramic expands to its original shape, ejecting a droplet of liquid from the liquid channel.

The droplet forming means of a piezoelectric print head controls a set of piezoelectric ceramic transducers to apply a voltage to change the shape of a piezoelectric ceramic transducer. The droplet forming means may be a squeeze mode actuator, a bend mode actuator, a push mode actuator or a shear mode actuator or another type of piezoelectric actuator.

Suitable commercial piezoelectric print head are TOSHIBA TEC™ CK1 and CK1L from TOSHIBA TEC™ (https://www.toshibatec.co.jp/en/products/industrial/inkjet/prod ucts/cf1/) and XAAR™ 1002 from XAAR™ (http://www.xaar.com/en/products/xaar-1002).

A liquid channel in a piezoelectric print head is also called a pressure chamber.

Between a liquid channel and a master inlet of the piezoelectric print head, there is a manifold connected to store the liquid to supply to the set of liquid channels.

The Piezoelectric print head is preferably a through-flow piezoelectric print head. In a preferred embodiment the recirculation of the liquid in a through-flow piezoelectric print head flows between a set of liquid channels and the inlet of the nozzle wherein the set of liquid channels corresponds to the nozzle.

In a preferred embodiment in a Piezoelectric print head the minimum drop size of one single jetted droplet is from 0.1 pL to 300 pL, in a more preferred embodiment the minimum drop size is from 1 pL to 30 pL, in a most preferred embodiment the minimum drop size is from 1.5 pL to 15 pL. By using grayscale inkjet head technology multiple single droplets may form larger drop sizes.

In a preferred embodiment the Piezoelectric print head has a drop velocity from 3 meters per second to 15 meters per second, in a more preferred embodiment the drop velocity is from 5 meters per second to 10 meters per second, in a most preferred embodiment the drop velocity is from 6 meters per second to 8 meters per second.

In a preferred embodiment the Piezoelectric print head has a native print resolution from 25 DPI to 2400 DPI, in a more preferred embodiment the Piezoelectric print head has a native print resolution from 50 DPI to 2400 DPI and in a most preferred embodiment the Piezoelectric print head has a native print resolution from 150 DPI to 3600 DPI.

In a preferred embodiment with the Piezoelectric print head the jetting viscosity is from 8 mPa·s to 200 mPa·s more preferably from 25 mPa·s to 100 mPa·s and most preferably from 30 mPa·s to 70 mPa·s.

In a preferred embodiment with the Piezoelectric print head the jetting temperature is from 10° C. to 100° C. more preferably from 20° C. to 60° C. and most preferably from 30° C. to 50° C.

The nozzle spacing distance of the nozzle row in a piezoelectric print head is preferably from 10 µm to 200 µm; more preferably from 10 µm to 85 µm; and most preferably from 10 µm to 45 µm.

Inkjet Ink

In a preferred embodiment, the liquid in the print head (305) is an aqueous curable inkjet ink, and in a most preferred embodiment the inkjet ink is an UV curable inkjet ink.

A preferred aqueous curable inkjet ink includes an aqueous medium and polymer nanoparticles charged with a polymerizable compound. The polymerizable compound is preferably selected from the group consisting of a monomer, an oligomer, a polymerizable photoinitiator, and a polymerizable co-initiator.

In a preferred embodiment the inkjet ink is an inorganic pigment ink specially developed for glass printing, specifically float glass and laminated safety glass (LSG). The inkjet ink preferably comprises a mixture of metallic; non-toxic pigments, lead-free glass frits and dispersing and carrier fluids. The inkjet ink is suitable for directly printing on glass without the need of priming the glass. This preferred and more preferred inkjet ink, when fired in an external oven above 400 degrees Celsius, the ink melts together with the glass permanently.

An inkjet ink may be a colourless inkjet ink and be used, for example, as a primer to improve adhesion or as a varnish to obtain the desired gloss. However, preferably the inkjet ink includes at least one colorant, more preferably a colour pigment. The inkjet ink may be a cyan, magenta, yellow, black, red, green, blue, orange or a spot color inkjet ink, preferable a corporate spot color inkjet ink such as red colour inkjet ink of Coca-Cola™ and the blue colour inkjet inks of VISA™ or KLM™. In a preferred embodiment the inkjet ink comprises metallic particles or comprising inorganic particles such as a white inkjet ink.

An inkjet ink may comprise functionality features such as anti-slip, electrically conductivity, anti-bacterial.

In a preferred embodiment an inkjet ink contains one or more pigments selected from the group consisting of carbon black, C.I. Pigment Blue 15:3, C.I. Pigment Blue 15:4, C.I Pigment Yellow 150, C.I Pigment Yellow 151, C.I. Pigment Yellow 180, C.I. Pigment Yellow 74, C.I Pigment Red 254, C.I. Pigment Red 176, C.I. Pigment Red 122, and mixed crystals thereof.

Jetting Viscosity

The jetting viscosity is measured by measuring the viscosity of the liquid at the jetting temperature.

The jetting viscosity may be measured with various types of viscometers such as a Brookfield DV-II+ viscometer at jetting temperature and at 12 rotations per minute (RPM) using a CPE 40 spindle which corresponds to a shear rate of 90 s−1 or with the HAAKE Rotovisco 1 Rheometer with sensor C60/1 Ti at a shear rate of 1000 s−1

In a preferred embodiment the jetting viscosity is from 10 mPa·s to 200 mPa·s more preferably from 25 mPa·s to 100 mPa·s and most preferably from 30 mPa·s to 70 mPa·s.

The jetting temperature may be measured with various types of thermometers.

The jetting temperature of jetted liquid is measured at the exit of a nozzle in the print head (305) while jetting or it may be measured by measuring the temperature of the liquid in the liquid channels or nozzle while jetting through the nozzle.

In a preferred embodiment the jetting temperature is from 10° C. to 100° C. more preferably from 20° C. to 60° C. and most preferably from 30° C. to 50° C.

REFERENCE SIGNS LIST

TABLE 1

| 450 | Ball transfer unit (450) | 100 | Removable flat substrate support device |
|---|---|---|---|
| 300 | Inkjet printing device | 400 | Vacuum flatbed table |
| 950 | Load ball | 120 | Treatment means |
| 930 | Support balls (930) | 350 | Print head movement |
| 940 | Bolt | 431 | Pulley |
| 920 | Felt seal | 432 | Vacuum belt |
| 910 | Housing | 108 | Set of idler rolls |

TABLE 1-continued

| 305 | Print head |
| 315 | Drying system |
| 502 | Substrate |

The invention claimed is:

1. An inkjet printing device comprising:
a vacuum flatbed table that supports and holds a flat substrate by vacuum during printing and within a hold down area having a surface area between 3 m² and 50 m²;
a removable flat substrate support that supports the flat substrate during printing within a contact area have a surface area between 3 m² and 50 m²; and
a vacuum belt connected to a plurality of pulleys and wrapped around the vacuum flatbed table; wherein
the vacuum flatbed table holds the removable flat substrate support stationary to the vacuum flatbed table by vacuum;
the vacuum belt is located between the removable flat substrate support and the vacuum flatbed table and carries the removable flat substrate support thereon; and
the removable flat substrate support includes:
a temperature regulator that heats and/or cools the flat substrate; and/or
a curing device that immobilizes a jetted ink layer on the flat substrate; and/or
a thermal insulation material that reduces a temperature transfer from the flat substrate to the vacuum flatbed table, or from the vacuum flatbed table to the flat substrate.

2. The inkjet printing device according to claim 1, wherein the removable flat substrate support includes:
a humidity regulator that humidifies and/or dehumidifies the flat substrate using a liquid.

3. The inkjet printing device according to claim 1, wherein the removable flat substrate support includes:
idler rollers that support the flat substrate.

4. The inkjet printing device according to claim 1, wherein the removable flat substrate support includes:
a plurality of ball transports that position the flat substrate; wherein
the flat substrate has a density between 750 kg/m³ and 20,000 kg/m³.

5. The inkjet printing device according to claim 1, wherein the removable flat substrate support includes a plug-and-play device.

6. The inkjet printing device according to claim 1, wherein the inkjet printing device is a flexible substrate inkjet printing device.

7. The inkjet printing device according to claim 6, wherein the inkjet printing device is a leather inkjet printing device.

8. The inkjet printing device according to claim 7, wherein the flat substrate supported by the removable flat substrate support is leather, but not artificial leather.

9. A method of using the inkjet printing device according to claim 8, the method comprising the steps of:
inkjet printing on the leather with the inkjet printing device to produce inkjet printed leather; and
using the inkjet printed leather to manufacture upholstery, clothing, or shoes.

\* \* \* \* \*